United States Patent [19]

Busch

[11] 4,094,483
[45] June 13, 1978

[54] MOUNTING DEVICE
[75] Inventor: Richard E. Busch, La Puente, Calif.
[73] Assignee: Addmaster Corporation, San Gabriel, Calif.
[21] Appl. No.: 803,665
[22] Filed: Jun. 6, 1977
[51] Int. Cl.² .............................................. F16L 3/08
[52] U.S. Cl. ..................... 248/73; 24/73 AP; 24/255 R; 248/220.4; 248/221.4
[58] Field of Search ............ 248/50, 73, 74 A, 316 D, 248/505, 220.4, 221.1, 221.2, 222.1, 221.4; 24/255 R, 73 AP, 73 AS, 73 PF, 73 SA

[56] References Cited
U.S. PATENT DOCUMENTS

| 884,256 | 4/1908 | Addie | 248/316 D |
|---|---|---|---|
| 2,513,494 | 7/1950 | Kline | 24/255 R |
| 2,712,917 | 7/1955 | Flora et al. | 24/73 SA |
| 2,855,648 | 10/1958 | Jansson | 248/71 X |
| 3,098,273 | 7/1963 | Cochran | 248/71 X |
| 3,154,281 | 10/1964 | Frank | 248/201 |
| 3,322,381 | 5/1967 | Bubb | 24/255 R X |
| 3,508,730 | 4/1970 | Knezo | 248/73 |
| 3,640,497 | 2/1972 | Waki | 248/220.4 |
| 3,718,881 | 2/1973 | Szanny | 24/255 R X |
| 3,989,210 | 11/1976 | Berkman et al. | 248/73 |

FOREIGN PATENT DOCUMENTS

| 283,140 | 4/1965 | Australia | 24/73 AP |
|---|---|---|---|
| 1,000,677 | 11/1976 | Canada | 248/73 |
| 1,532,707 | 7/1968 | France | 24/73 AP |
| 1,243,920 | 7/1967 | Germany | 24/73 SA |
| 1,025,169 | 4/1966 | United Kingdom | 248/73 |

Primary Examiner—Rodney H. Bonck

[57] ABSTRACT

A mounting device for removably mounting an article, such as a battery, to a supporting plate comprising a one piece molded plastic member having spaced relatively rigid legs with barbed tips at the lower ends thereof to latch against the support. The legs are formed with inwardly extending mid portions and upwardly extending upper portions integral with the inner ends of the mid portions. A flexible cross element is integrally connected between the inner ends of the mid portions. Flexible inwardly extending arms are integrally connected to the legs adjacent the mid portions to yieldably hold the article downwardly against the support.

2 Claims, 6 Drawing Figures

MOUNTING DEVICE

BACKGROUND OF THE INVENTION

1. Field of the Invention

This invention relates to a mounting device for mounting an article and has particular reference to a mounting device for removably mounting a small article such as a battery, capacitor or the like onto a supporting wall.

2. Description of the Prior Art

It is desirable to removably mount such items as batteries and the like, as are found in portable radios, pocket calculators, tape recorders and the like against displacement due to vibration or jarring forces and yet permit ready replacement. This has generally been accomplished heretofore by the use of resilient clips which are secured by screws, etc., to a supporting plate or other wall structure. Although such devices are generally satisfactory they do not positively hold the battery, etc., from removal and also require the use of additional fasteners such as screws to attach the same to the wall structure. This not only increases the cost of manufacture but also increases the time required for assembly, particularly if a relatively large number of such items are used.

The U.S. Pat. No. 3,154,281 to Frank illustrates an improved clip of the above type which may be merely snapped into place, thereby reducing assembly time and eliminating fasteners. However, such clip merely frictionally holds the article in place. Also, it is difficult to remove the clip from its wall support once it is attached thereto.

SUMMARY OF THE INVENTION

It therefore becomes a principal object of the present invention to provide a one-piece mounting device for an article which positively holds the article against removal on a support.

Another object is to provide a mounting device of the above type which may be readily attached or detached from its support.

Another object is to provide a mounting device of the above type which will accommodate articles and wall structures of varying thicknesses.

A further object is to provide a one-piece molded plastic mounting device of the above type which is simple and economical to manufacture and which does not require extra parts or tools for attachment or detachment from a wall structure.

According to the basic aspect of the present invention, a one-piece plastic molded mounting device is provided comprising spaced relatively rigid legs having barbed tips at the lower ends thereof for latching engagement with a supporting wall or plate. The legs are integrally connected at their mid sections by a relatively flexible cross element which also provides a pivoting action so that by squeezing the upper portions of the legs together the barbed tips may be removed from latching engagement with the supporting wall to permit ready removal of the article. Flexible arms are connected to the legs adjacent the cross element to yieldably hold the article in intimate contact with the supporting wall.

BRIEF DESCRIPTION OF THE DRAWINGS

The manner in which the above and other objects of the invention are accomplished will be readily understood on reference to the following specification when read in conjunction with the accompanying drawings, wherein.

DESCRIPTION OF THE PREFERRED EMBODIMENT

Figure 1:
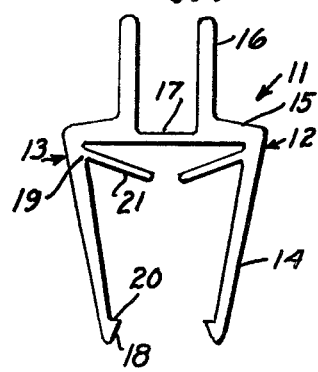
FIG. 1 is a front view of a mounting device embodying a preferred form of the present invention.
Figure 2:
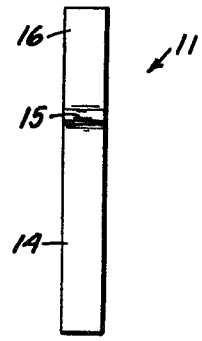
FIG. 2 is a side view of the mounting device.

Referring to the drawing, the mounting device which is generally indicated at 11, is of a one-piece molded plastic material and comprises two spaced relatively rigid legs 12 and 13, each forming a vertically extending lower portion 14, a horizontally and inwardly extending mid portion 15 and a vertically extending upper portion 16 integral with the inner end of the mid portion 15. A relatively thin, flexible interconnecting section 17 integrally connects the two legs 12 and 13 at the junctures of the mid and upper portions 15 and 16, respectively. Such section 17 yieldably maintains the legs in their relative positions shown in FIG. 1 and also forms a pivotal connection whereby when the upper leg portions 16 are squeezed together, the lower leg portion 14 will be spread apart.

The lower ends of the legs 12 and 13 terminate in inwardly extending barbs 18, each having a latching shoulder 20 formed thereon.

Flexible retainer arms 21 are integrally connected to the legs 12 and 13 at 19, just below the juncture of the lower and mid portions 14 and 15, respectively, of both legs 12 and 13. The arms 21 extend inwardly toward each other and also converge downwardly as shown in FIG. 1 when not in engagement with an article.

Figure 3:
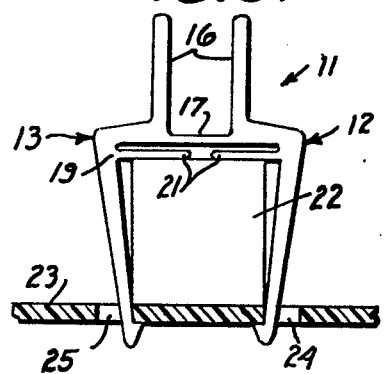
FIG. 3 is a front view similar to FIG. 1 but showing the device mounting an article on a supporting wall.
Figure 4:
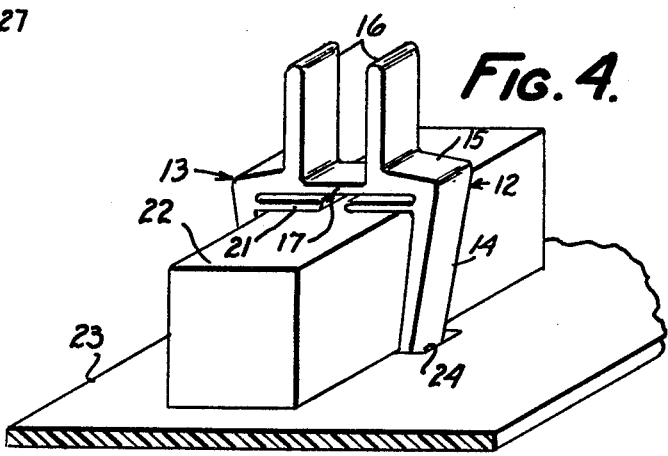
FIG. 4 is a perspective view illustrating the mounting device in position mounting an article on a supporting wall.

As seen in FIGS. 3 and 4, the mounting device is intended to secure an article 22, such as a battery, in direct contact with a support plate 23. The latter may, for example, be a printed circuit board of insulating material having circuit conductors (not shown) on the upper surface thereof engagable with suitable electrical contacts (also not shown) on the battery to establish an electrical circuit with the battery. For this purpose, spaced rectangular apertures 24 and 25 are punched or otherwise formed in the plate 23. The article 22 is layed against the plate 23 and the mounting device 11 is positioned to straddle the opposite sides of the article. As the mounting device is pressed downwardly, the arms 21 yieldably engage the top surface of the article and press it against the plate 23 until the shoulders 20 of the barbed tips 18 move into latching engagement over the edges of the apertures 24 and 25, thereby engaging the sides of the article and locking the same in place. Since the arms 21 are connected to the legs 14 at the locations 19, as such arms are deflected upwardly they aid the cross element 17 in spring biasing the barbed tips 18 toward each other to maintain the device in locked condition. Suitable means, not shown, may be provided to positively prevent lateral shifting of the article on the plate 23.

In order to remove the article 22 for replacement or for other purposes, the upper leg portions 16 are merely squeezed together, thereby spreading the barbed tips 18 until the shoulders 20 become disengaged from the edges of the apertures 24 and 25, thus enabling the mounting device and article to be readily removed from the plate 23.

From the above it will be seen that the mounting device can accommodate supporting plates and articles of relatively widely varying tolerances in thickness and can be quickly and readily removed and replaced without the need of tools or other fastening means.

Figure 5:
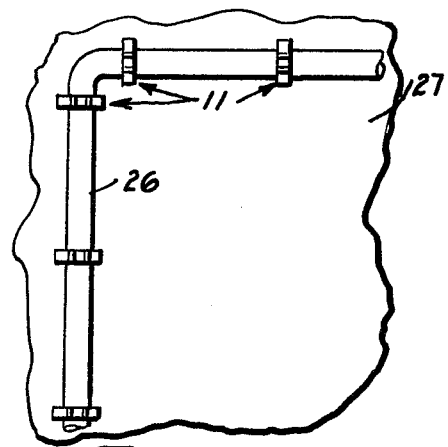
FIG. 5 is a plan view illustrating a plurality of mounting devices of the present invention mounting a cable or the like on a supporting wall.

FIG. 5 illustrates the use of a series of mounting devices 11 for attaching a conduit 26 or the like in place against a supporting wall 27.

Figure 6:
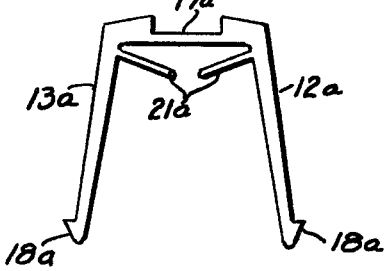
FIG. 6 is a front view of a modified form of the invention.

FIG. 6 illustrates a modified form of the invention in which the upper leg portions have been removed and the barbs 18a are located on the outsides of the legs 12a and 13a. In this case, the flexible cross element 17a must be stiff enough to spring bias the legs outwardly against the inward bias exerted thereagainst by the retainer arms 21a when deflected upwardly by the article being mounted.

It will be obvious to those skilled in the art that many variations may be made in the exact construction shown without departing from the spirit of the invention.

I claim:

1. A device for mounting an article on a support comprising
   a one-piece member of plastic material having spaced relatively stiff legs,
   said legss having upper, lower, and mid portions,
   said lower portions adapted to straddle opposite sides of said article,
   said lower portions having inwardly extending barbs at the lower ends thereof for latching engagement with said support,
   a relatively flexible cross element connected between said mid portions of said legs,
   said upper portions being movable toward each other whereby to rock said arms to release said barbs from latching engagement with said support, and
   inward extending yieldable arms integral at their outer ends with said lower portions for engagement with said article.

2. A device for mounting an article on a support comprising
   a one-piece member of plastic material having spaced relatively stiff legs,
   said legs having lower portions adapted to straddle opposite sides of said article,
   said lower portions having inwardly extending barbs at the lower ends thereof for latching engagement with said support,
   said legs having mid portions extending inwardly toward each other from said upper portions and having upper portions extending upwardly from the inner ends of said mid portions;
   said lower and upper portions extending substantially parallel to each other,
   a relatively flexible cross element connected between the inner ends of said mid portion, and
   inwardly extending yieldable arms integral at their outer ends with said legs on the sides of said mid portions facing said barbs.

* * * * *